United States Patent [19]

Higaki et al.

[11] 3,726,986

[45] Apr. 10, 1973

[54] SUSPENSION TYPE ELECTRIC APPARATUS HAVING A PLURALITY OF RADIALLY DISPOSED BUFFER DEVICES

[75] Inventors: Shigeo Higaki; Masatoshi Harada; Tadao Yashiro; Maebashi Ohminato, all of Maebashi-shi, Japan

[73] Assignee: Nishin Electric Co., Ltd., Kyoto-shi, Kyoto, Japan

[22] Filed: Sept. 13, 1971

[21] Appl. No.: 180,056

[30] Foreign Application Priority Data

Nov. 30, 1970 Japan ....................45/106117
Nov. 30, 1970 Japan ....................45/106118

[52] U.S. Cl. ....................174/43, 52/167, 248/358 R, 317/103

[51] Int. Cl. ....................H02b 5/00

[58] Field of Search ....................174/40 R, 40 TD, 174/42, 43, 45 R, 45 TD; 52/167; 248/15, 18, 20, 358 R, 358 AA, 399, 401; 317/103

[56] References Cited

UNITED STATES PATENTS 2,055,000 9/1936 Bacigalupo ....................52/167

FOREIGN PATENTS OR APPLICATIONS 1,184,390 12/1964 Germany ....................174/40 TD
859,642 12/1952 Germany ....................174/45 R

*Primary Examiner*—Laramie E. Askin
*Attorney*—Sughrue, Rothwell, Mion, Zinn & Macpeak and Seas, Jr., Mexic, Sloan, Olexy and Osha

[57] ABSTRACT

A suspension type electric apparatus wherein a variety of buffer devices are connected between the lower end of the electric apparatus and a fixed ground support. Each of the buffer devices is connected at one end to the ground support and at the other end to the electric apparatus. In accordance with one embodiment of the present invention, at least one of the ends of each buffer device is provided with a universal coupling, and the buffer devices are arranged in substantially a horizontal plane such that the vertical force component on the apparatus produced by an earthquake or wind pressure will be as small as possible. In another embodiment of the present invention, each of the buffer devices comprises a plurality of resilient bodies having different operational ranges, so that the spring constant of the buffer device will be larger in response to a larger lateral displacement of the electric apparatus.

9 Claims, 9 Drawing Figures

SUSPENSION TYPE ELECTRIC APPARATUS HAVING A PLURALITY OF RADIALLY DISPOSED BUFFER DEVICES

BACKGROUND OF THE INVENTION

This invention relates to a suspension type electric apparatus and, more particularly, to a type of suspension thereof, whereby the lateral vibration of the electric apparatus during an earthquake or high wind pressure can be effectively prevented.

Recently, the transmission voltage has been increased to super high voltage and to ultra high voltage, and electric apparatus employed for the transmission lines have been designed to accommodate such voltages. Particularly, electric apparatus such as condenser-type instrument transformers or current transformers, and those consisting of condensers, arresters or the like have had substantially longer lengths from the viewpoint of the required electrical insulation. Also, because such electric apparatus cannot normally be of the self-standing type owing to insufficient strength, such apparatus is normally supported by a suspension system to be more fully described hereinafter. Such suspension systems are advantageous in that they provide a free vibration period that is substantially longer than that of the ordinary earthquake, whereby the lateral swinging range caused by the earthquake is limited to a very small value, and the resistivity to the earthquake or to wind pressure or the like is widely improved.

In such suspended type electric apparatus, the lower end of the suspended electric apparatus is normally coupled to the ground through a buffer device or the like. With many of the presently used buffer devices, however, when the electric apparatus is swung by the force of an earthquake or wind pressure or the like, a substantial vertical force component is created which adds substantially to the vertical force on the support structure for the electric apparatus, and such additional force requires that the support structure, the electric apparatus and the accessories be designed to withstand this greater vertical force. This results in a more complicated and more expensive suspension type electric apparatus.

Also, if the coupling between the buffer device and the electric apparatus is too tight, the lateral shock of the earthquake has a tendency to be transmitted through the buffer device to the electric apparatus, and the mechanical load applied thereto is relatively large. On the other hand, if the coupling between the buffer device and the electric apparatus is too loose, this could result in a large lateral swinging movement of the electric apparatus caused by wind pressure or the like, which is undesirable.

SUMMARY OF THE INVENTION

In accordance with the present invention, the electric apparatus is coupled to a ground support by a plurality of buffer devices that are radially disposed around the lower end of the electric apparatus. In one embodiment, each one of the buffer devices is connected to the ground support or to the electric apparatus by a universal coupling, and the buffer devices are arranged substantially in a horizontal plane such that the vertical force component during lateral swinging will be as small as possible.

In another embodiment of the present invention, each of the buffer devices comprises a plurality of resilient bodies having different operational ranges, so that the spring constant of the buffer will be larger in response to a larger amount of lateral displacement of the electric apparatus.

BRIEF DESCRIPTION OF THE DRAWINGS

FIG. 2(*a*) is a schematic front view of an embodiment of the suspension type electric apparatus constructed in accordance with the present invention;

FIG. 2(*b*) is a sectional view taken substantially along line 2*b*—2*b* of FIG. 2(*a*);

FIG. 3(*b*) is a sectional view taken substantially along line 3*b*—3*b* of FIG. 3(*a*);

DESCRIPTION OF THE PREFERRED EMBODIMENTS

Figures 1, 2A, 2B:
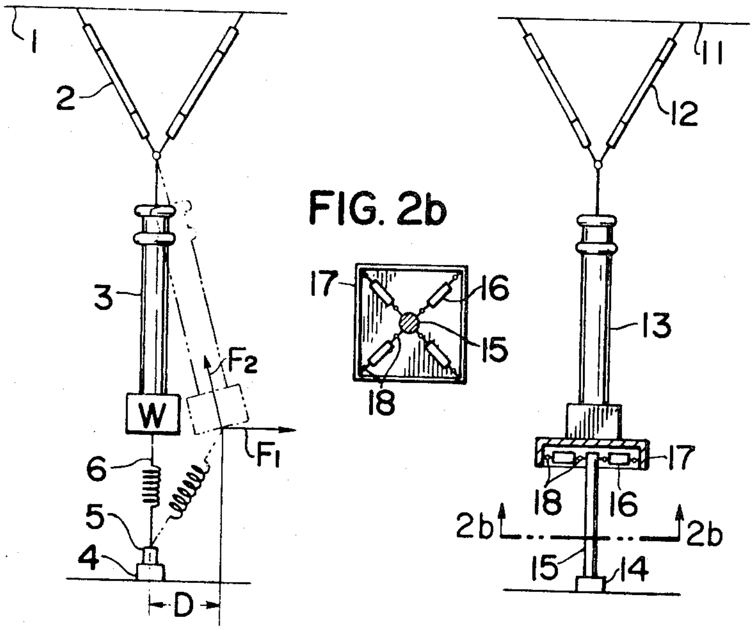
FIG. 1 PRIOR ART, FIG. 2a, FIG. 2b
FIG. 1 is a schematic view of a conventional suspension type electric apparatus.

In the conventional apparatus shown in FIG. 1, the upper portion of the electric apparatus 3 is suspended from a support or iron angle structure 1 in a substation or the like by means of, for example, V-shaped porcelain insulators 2, and the lower end of the electric apparatus 3 is connected to one end of a buffer device 6, such as a spring damper, which is connected at its other end to a ground support in the form of a supporting member 5 provided in a concrete base 4. A displaced position of the electric apparatus 3, as caused by an earthquake or wind pressure, is indicated by dotted lines in FIG. 1, wherein $F_1$ represents a horizontal component and $F_2$ represents a vertical component of the force produced by the earthquake, wind pressure or the like. Also, D represents an allowable swinging range in the horizontal direction, and W represents the weight of the electric apparatus 3.

In the conventional type of suspended electric apparatus shown in FIG. 1, when the electric apparatus 3 is swung by an earthquake, wind pressure or the like, as indicated by broken lines, the vertical force component $F_2$ is added to the weight of the apparatus and they jointly apply a large vertical force to the support or iron angle structure 1. As a result, the iron angle structure 1, the electric apparatus 3 and the accessories for supporting the electric apparatus must be designed to withstand a substantial vertical force, which results in a complicated and expensive design. Further, such a design does not serve to restrict the swinging range D because the restriction of the swinging range D results in increasing the vertical component $F_2$. It will be readily seen, therefore, that the conventional suspension type electric apparatus has not been particularly suitable for withstanding earthquake and wind pressure forces with apparatus that is both simple in construction and economical to manufacture.

Figure 4:
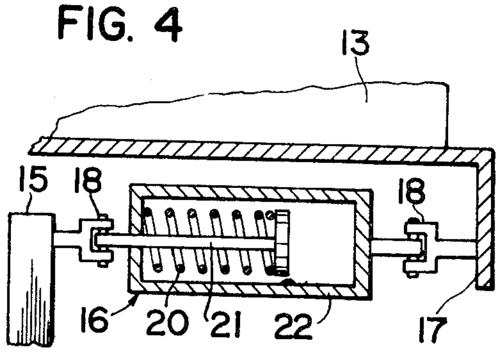
FIG. 4 is an enlarged partial sectional view of an embodiment of a buffer device employed in the present invention.

The first embodiment of a suspension type electric apparatus constructed in accordance with the present invention is shown in FIGS. 2(*a*) and (*b*). In these drawings, the numeral 11 designates the supporting or iron-angle structure; the numeral 12 designates the V-shaped porcelain insulators suspending the electric apparatus 13; and the numeral 14 designates a ground support in the form of a concrete base formed on the earth and supporting a pole shaped supporting member 15 which is fixed thereon. Numeral 16 designates the buffer devices of the present invention, each of which may be made of a spring, spring damper, oil damper, rubber damper, air damper, or any other suitable type of damper. As an illustrative example, a suitable buffer device is shown in FIG. 4 wherein a spring 20 is mounted around the rod of a piston 21 that is positioned within a cylinder 22. A peripheral wall 17 is fixed to the lower end of the electrical apparatus 13. Each buffer device 16 is connected to the supporting member 15 and to the wall 17 by a pair of couplings 18, at least one of which preferably is a universal coupling.

As shown in FIGS. 2(*a*) and (*b*), the buffer devices 16 preferably are arranged radially around the center of the electric apparatus 13 and are disposed substantially in a horizontal plane so that the vertical component of the force created at the time of lateral swinging in response to an earthquake or wind pressure is limited to as small a value as possible.

Due to the construction of the embodiment of the present invention shown in FIGS. 2(*a*) and (*b*), even if the electric apparatus is subjected to a horizontal force caused by an earthquake or wind pressure, the swinging range of the electric apparatus is limited to a predetermined value by the plurality of buffer devices 16. Also, the vertical force component created at that time, that is, the tensile force created in the electric apparatus, is substantially nullified because of the provision of the plurality of buffer devices 16 disposed substantially in a horizontal plane radially around the center of the electric apparatus. As a result, the support or iron-angle structure, the electric apparatus and other supporting accessories are not subjected to any force stronger than the weight of the electric apparatus, with the consequent advantage that the design of the suspended apparatus can be simplified and can be manufactured at a low cost. Further, the allowable swinging range in the lateral direction can be suitably limited by selecting the buffer devices as desired, and various other advantageous features can also be obtained through the use of the first embodiment of the present apparatus hereinbefore described.

Figure 3A:
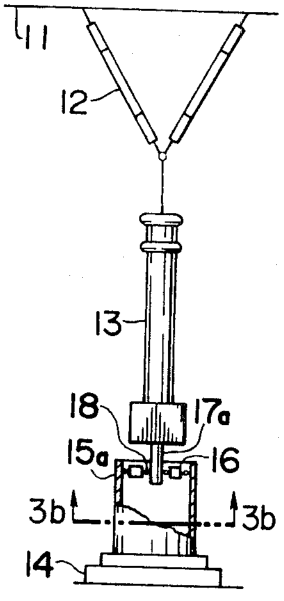
FIG. 3(*a*) is a schematic front view of another embodiment of the suspension type electric apparatus of the present invention.
Figure 3B:
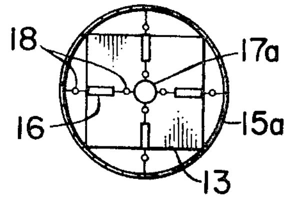

In a second embodiment of the apparatus of the present invention shown in FIGS. 3(*a*) and (*b*), a tubular support 15*a* is secured to and extends upwardly from the base 14 in surrounding relation to an elongated pole shaped member 17a extending downwardly from the lower end of the electric apparatus 13. The plurality of buffer devices 16 are radially disposed between the support 15*a* and the member 17*a* and are connected to each of them. In this embodiment, a universal coupling 18 preferably is employed between the depending member 17*a* and each of the buffer devices 16, and the buffer devices preferably are disposed in a substantially horizontal plane as hereinbefore described. An ordinary coupling of any suitable type may be employed between the outer end of each buffer device and the tubular support 15*a*, as shown in FIGS. 3(*a*) and (*b*). This embodiment of the present invention will function in substantially the same manner as the embodiment shown in FIGS. 2(*a*) and (*b*) and hereinbefore described.

Figure 5:
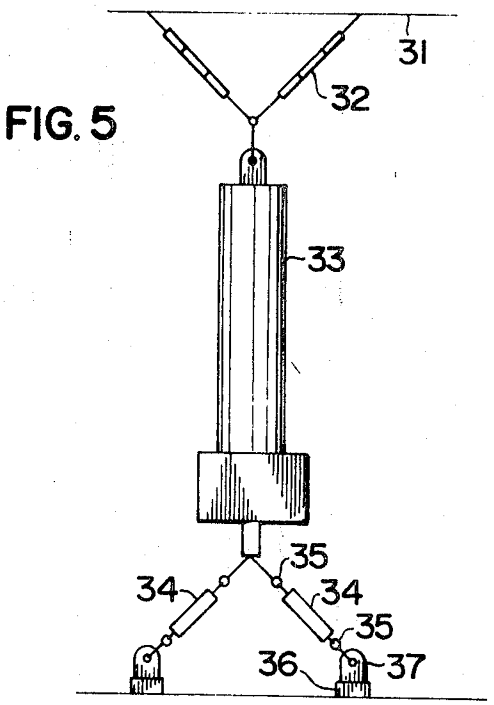
FIG. 5 is a schematic front view of a further embodiment of a suspension type electric apparatus constructed in accordance with the present invention.
Figure 6:
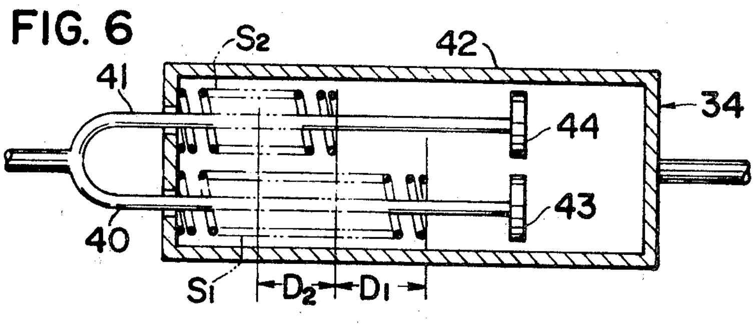
FIG. 6 is an enlarged partial sectional view showing an example of a buffer device that may be employed in the apparatus shown in FIG. 5.

A third embodiment of the present invention is shown in FIGS. 5 and 6. In this third embodiment, the numeral 31 designates a support or iron angle structure, 32 designates a suspending device such as V-shaped porcelain insulators, and 33 designates the electric apparatus. A plurality of buffer devices 34 are connected between the lower end of the electric apparatus 33 and ground supports comprising a concrete base 36 and an upstanding support 37 fixed to the base 36.

Each of the buffer devices 34 may comprise, for example, springs, spring dampers, oil dampers, rubber dampers, air dampers, or any other suitable damping means. As shown in FIG. 6, each buffer device 34 comprises a pair of flexible and resilient bodies, such as springs $S_1$ and $S_2$ which are mounted on and surround rods 40 and 41, respectively that extend into a cylinder 42 and are provided with enlarged heads 43 and 44 that are adapted to engage the springs $S_1$ and $S_2$, respectively. The first spring $S_1$ is constructed so as to have a small spring constant and thus a small damper action, and the second spring $S_2$ is constructed so as to have a larger spring constant and thus a larger damper action. The characteristic relation between the load and the deformation caused by each of the springs $S_1$ and $S_2$ are indicated in FIG. 3 by a nonlinear graphical representation which will be more fully described hereinafter. In accordance with the third embodiment of the present invention, therefore, the buffering effect of the buffer devices 34 will initially be small in response to a small lateral swinging or displacement of the electric apparatus 33 since only the first spring $S_1$ having a small spring constant will be initially deformed by its engagement with the head 43 of rod 40. In the case of a larger displacement, the head 44 on rod 41 will then engage the second spring $S_2$ having a larger spring constant and thus the buffering effect will be substantially increased.

The buffer devices 34 may be connected to the lower end of the electric apparatus 33 and to the upstanding supports 37 in any suitable manner such as by couplers 35 which may be of any suitable construction. The couplers 35 may be of the ordinary type of may be universal couplers.

Figure 7:
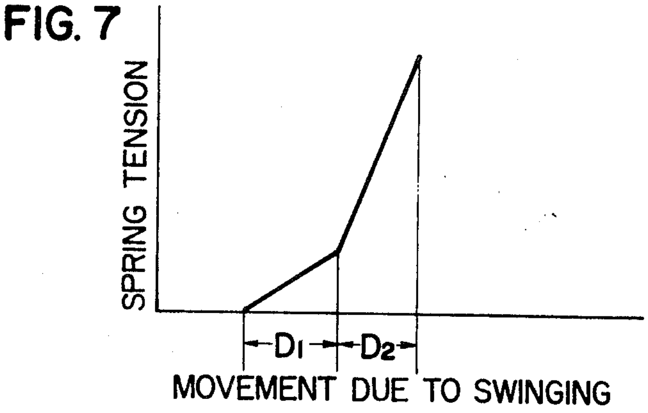
FIG. 7 is a graphical representation showing the characteristics of springs employed in the buffer device shown in FIG. 6.

In FIGS. 6 and 7, $D_1$ and $D_2$ correspond respectively to the amount of deformation of the springs $S_1$ and $S_2$ in response to the lateral swinging movement or displacement of the electric apparatus 3 caused by an earthquake, wind pressure or the like. As hereinbefore described, since each buffer device 34 comprises a plurality of flexible and resilient members having different spring constants, the buffering effect thereof is enlarged in accordance with the increase of the lateral displacement of the electric apparatus. Thus, in the case of an earthquake where the swinging displacement of the electric apparatus is relatively small, the coupling between the electric apparatus and the ground support is relatively loose due to the low spring constant of the first spring $S_1$, thereby substantially eliminating the transmission of shock to the electric apparatus 33 at the time of the earthquake. On the other hand, when the lateral swinging movement of the electric apparatus 33 is caused by wind pressure and thus is rather high, the second spring $S_2$ having the higher spring constant serves to provide a greater buffering effect so as to dampen the larger lateral swinging movement to reduce shock forces on the electric apparatus 33. This operation of each of the buffer devices 34 is clearly seen in the graphical representation of FIG. 7 wherein the buffering effect of each buffer device 34 is substantially increased after the initial deformation distance $D_1$ and during the subsequent deformation distance $D_2$.

While the invention has been particularly shown and described with reference to preferred embodiments thereof, it will be understood by those skilled in the art that various changes in form and details may be made therein without departing from the spirit and scope of the invention.

What is claimed is:

1. In a suspension type electric apparatus comprising an elevated support, a ground support, an electric apparatus suspended from the elevated support, and buffer means connected between the electric apparatus and the ground support to dampen shocks caused by earthquakes, wind pressure or the like, and wherein said buffer means comprises a plurality of buffer devices substantially radially disposed between the electric apparatus and the ground support, and being disposed in a substantially common horizontal plane, the improvement wherein each of said buffer devices isconnected to the electric apparatus by a universal coupling.

2. The apparatus of claim 1 wherein each of said buffer devices is connected to the ground support by a universal coupling.

3. The apparatus of claim 1 wherein an annular wall is connected to and depends from the lower end of the electric apparatus, said buffer devices are connected at the outer end thereof to said wall, and said ground support comprises a pole-like member extending upwardly within said annular wall, said buffer devices being connected at the inner end thereof to said pole-like member.

4. The apparatus of claim 1 wherein an annular wall is connected to and extends upwardly from the ground support, said buffer devices are connected at the outer end thereof to said wall, and a pole-like member is connected to and depends from the lower end of the electric apparatus, said pole-like member extending within said annular wall, and said buffer devices being connected at the inner end thereof to said pole-like member.

5. In a suspension type electric apparatus comprising an elevated support, a ground support, an electric apparatus suspended from the elevated support, and buffer means connected between the electric apparatus and the ground support to dampen shocks caused by earthquakes, wind pressure or the like, and wherein said buffer means comprises a plurality of buffer devices substantially radially disposed between the electric apparatus and the ground support, and being disposed in a substantially common horizontal plane, the improvement wherein each of said buffer devices is connected to the ground support by a universal coupling.

6. In a suspension type electric apparatus comprising an elevated support, a ground support, an electric apparatus suspended from the elevated support, and buffer means connected between the electric apparatus and the ground support to dampen shocks caused by earthquakes, wind pressure or the like; the improvement wherein said buffer means comprises a plurality of spaced buffer devices disposed between the electric apparatus and the ground support, each of said buffer devices comprising a first resilient means adapted to dampen with a small resistive force small displacements of the electric apparatus, and second resilient means adapted to dampen with a larger resistive force large displacements of the electric apparatus.

7. The apparatus of claim 6 wherein said first resilient means comprises a first spring having a small spring constant, and said second resilient means comprises a second spring having a larger spring constant than said first spring, said first spring being positioned to be deformed in response to small displacements of the electric apparatus, and said second spring being positioned to be deformed in response to large displacements of the electric apparatus.

8. The apparatus of claim 6 wherein each of said buffer devices is connected to the electric apparatus by a universal coupling.

9. The apparatus of claim 6 wherein each of said buffer devices is connected to the ground support by a universal coupling.

* * * * *